J. C. KOPF.

LIFTING JACK.

APPLICATION FILED JULY 27, 1920.

Reissued Nov. 23, 1920.

14,991.

2 SHEETS—SHEET 1.

INVENTOR.

John C. Kopf

BY

J. Vandenburg

ATTORNEY

J. C. KOPF.

LIFTING JACK.

APPLICATION FILED JULY 27, 1920.

Reissued Nov. 23, 1920.

14,991.

2 SHEETS—SHEET 2.

INVENTOR.

John C. Kopf

BY

J. Bauchenberg

ATTORNEY

UNITED STATES PATENT OFFICE.

JOHN C. KOPF, OF BELLEVUE BOROUGH, PENNSYLVANIA, ASSIGNOR TO THE DUFF MANUFACTURING COMPANY, OF PITTSBURGH, PENNSYLVANIA, A CORPORATION OF PENNSYLVANIA.

LIFTING-JACK.

14,991. Specification of Reissued Letters Patent. Reissued Nov. 23, 1920.

Original No. 1,321,456, dated November 11, 1919, Serial No. 284,318, filed March 22, 1919. Application for reissue filed July 27, 1920. Serial No. 399,407.

*To all whom it may concern:*

Be it known that I, JOHN C. KOPF, of the borough of Bellevue, in the county of Allegheny and State of Pennsylvania, have invented a new and useful Improvement in Lifting-Jacks, of which the following is a full, clear, and exact description, reference being had to the accompanying drawings, forming part of this specification, in which—

Figure 1:
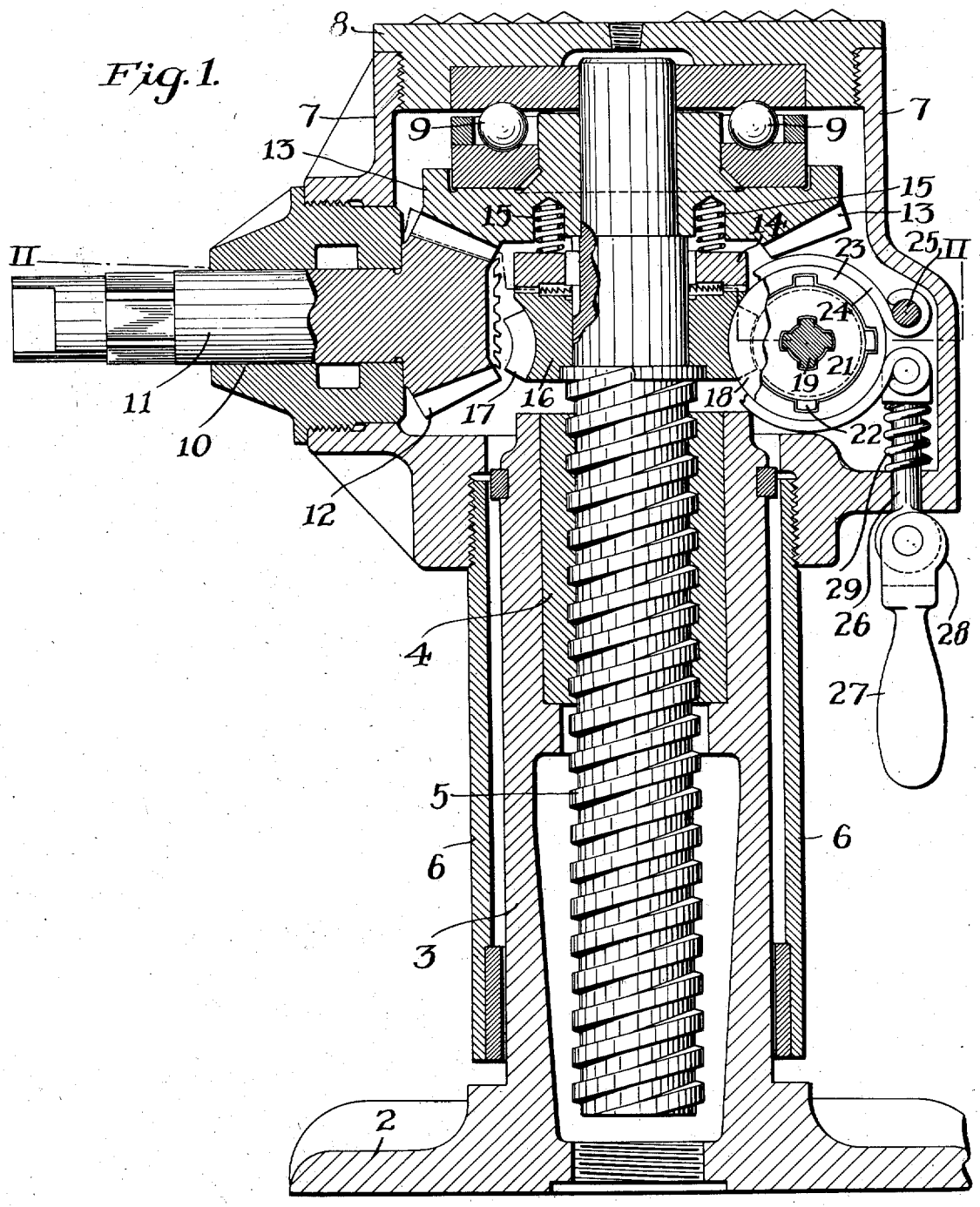
Figure 2:
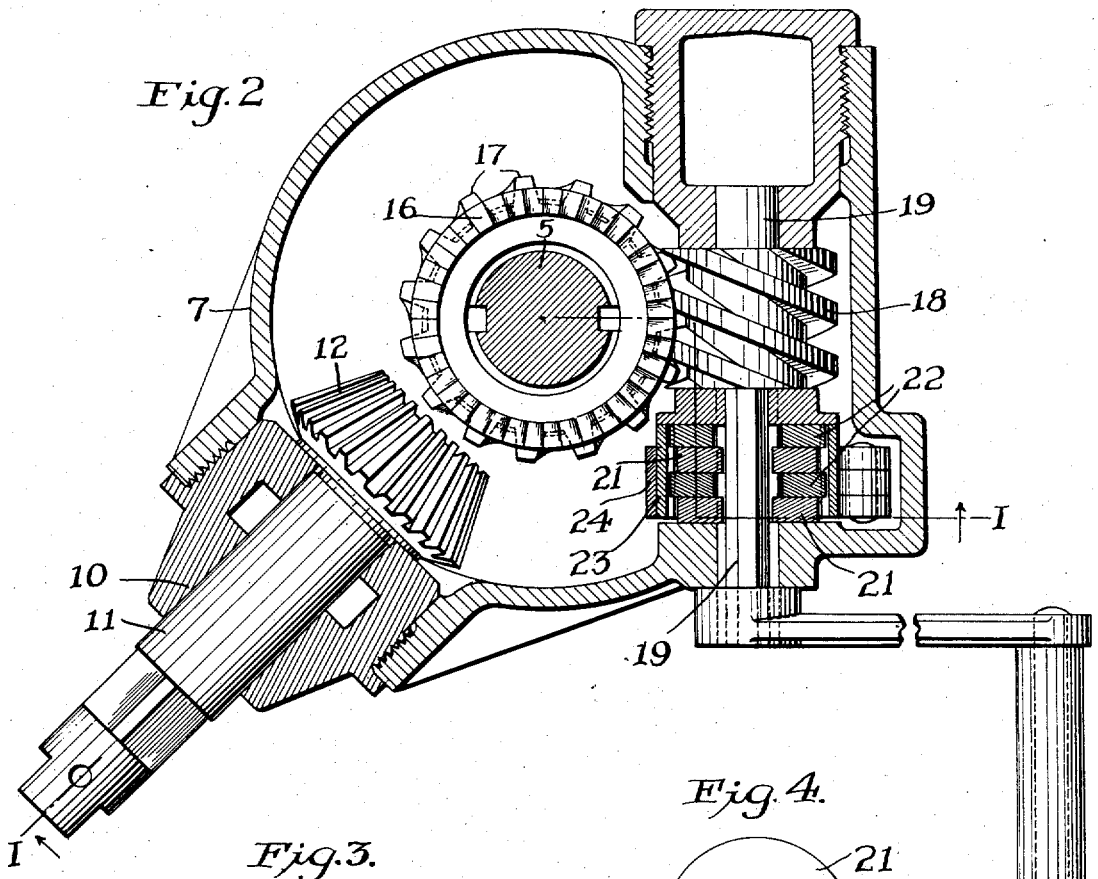
Figure 3:
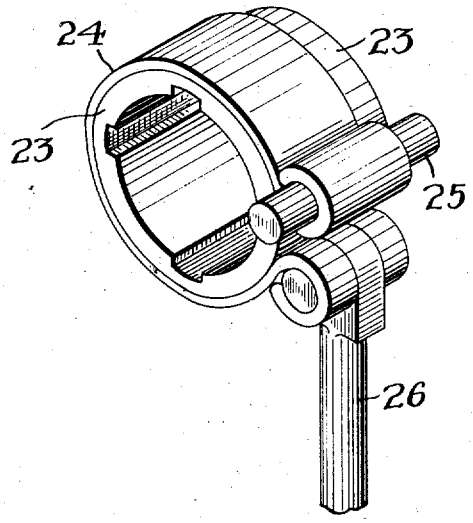
Figure 4:
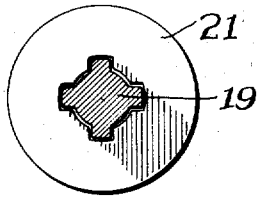
Figure 5:
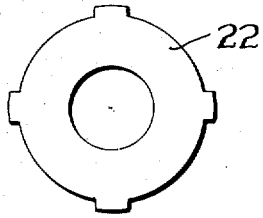

Figure 1 is a developed vertical section of a lifting jack embodying my invention, the general plane of the section being on the line I—I of Fig. 2; Fig. 2 is a horizontal section on the irregular line II—II of Fig. 1; Fig. 3 is a perspective view of the clutch barrel and its brake band; Fig. 4 is a detail sectional view showing one of the friction clutch disks and its engagement with its shaft; and Fig. 5 is a plan view showing one of the coöperating friction clutch disks.

My invention has relation to lifting jacks and more particularly to high-speed or self-lowering screw-jacks.

One of the objects of my invention is to provide a jack of this type having mechanism of simple, compact, strong, and effective character, wherein the action of the load on the jack is caused to automatically lock the jack against undesired descent.

A further object is to provide locking means of this character in which the locking action is directly proportional to the load on the jack, so that such action increases as the load increases, and the lock is capable of acting as a cushion for stopping, whereby a high degree of safety is afforded in the operation of these jacks.

A still further object is to provide manual means in connection with the locking means, whereby the jack may be rapidly operated when unloaded and whereby, also, the jack can be lowered in a loaded condition by manual effort exerted against a constantly applied holding resistance.

In the particular embodiment, a multiple-disk device is subject to the end-thrust of a worm, of such pitch as to be driven by a worm-wheel, which in turn has connection with a quick-pitch lifting screw, so that the action of the load is transmitted to compact and lock the flat surfaces of the multiple-disk device, which are capable of slippage of a beneficial nature,—as in arresting the momentum of lowering, or in case of manual rotation of the worm by a crank, which is preferably provided. An important feature and general object, therefore, has to do with the employment of such a device for the holding, lowering and stopping of self-lowering jacks.

The nature of my invention will be best understood by reference to the accompanying drawings, in which I have shown the preferred embodiment thereof and which will now be described, it being premised, however, that various changes can be made in the details of construction and general arrangement of the parts, without departing from the spirit and scope of my invention as defined in the appended claims.

In these drawings, the numeral 2 designates the base of the jack having an upwardly projecting cylindrical column 3, in which is secured the internally threaded nut 4. 5 designates the screw of the jack, which extends through the nut 4 and downwardly in the column 3. Surrounding the column 3 is a lifting shell 6, having secured to its upper end the casing 7, in which the operating parts presently to be described are mounted, and which carries at its upper end a lifting plate 8 to receive the load. This plate is provided with ball bearings at 9. Extending through a suitable bearing 10 in the side of the casing is an actuating stub shaft 11, adapted to receive the usual operating lever (not shown). At its inner end, said shaft carries the beveled pinion 12, whose teeth mesh with the horizontal beveled gear 13, which is keyed to the upper portion of the screw 5.

As thus far described, the parts are, in general, of well known character and form no part of my present invention except in combination. 14 designates a clutch member having a saw-toothed clutch face on its lower side and which is keyed to the screw 5 to rotate therewith and to move vertically thereon. This clutch member is pressed by springs 15 into engagement with the correspondingly formed clutch face of a second clutch member 16, which is loosely mounted on the screw 5, just above the thread thereof. The clutch member 16 is formed on its periphery with worm-wheel teeth 17, which engage the threads of a worm 18, secured to a horizontal shaft 19 mounted in suitable bearings in the casing 7. This shaft 19 is extended through the casing at one end and is provided with a hand crank 20. This shaft 19 is also provided with a multiple disk friction clutch device comprising one set of flat-faced friction elements, or clutch disks, 21, which are engaged with the shaft 19 to rotate therewith, and another set of intercalating disks 22, which are engaged on their peripheries with a barrel 23. These interjacent friction elements are disposed at one end of the worm 18, to be compacted by the end-thrust thereof under load, against the support of the side wall of the casing. Said barrel has a cylindrical outer surface which is surrounded by a friction brake band 24, one end of this band being connected to a fixed pin 25, and the other end to a rod 26, whose end is connected to a lever 27, having a cam or eccentric portion 28, which bears against the casing 7. A spring 29 is arranged to act on the rod 26.

The threads on the screw 5 and also the threads on the worm 18, are of relatively quick pitch, so that said screws will readily rotate under the action of a load on the jack. The operation is as follows:

The screw and the lifting head or plate 8 can be quickly run up to the load by turning the crank 20 and thereby turning the screw through the action of the worm 18 and worm wheel 16, the clutch faces of the members 14 and 16 engaging to cause said members to rotate together and thereby turn the screw. In this operation it is not necessary to release the lock or to set it again when the load is reached, because with no load upon the jack the frictional resistance between the members 21, 22 is inconsequential. The shaft 11 is then actuated by its lever in the usual manner to further raise the screw and lift the load.

In the intervals of lifting, and when the load has been raised to the desired height, the jack is automatically locked against running down by the action of the load transmitted from the screw through the worm-wheel to the quick-pitch worm, producing an end-thrust on the latter causing it to move endwise slightly and applying pressure to the disks which locks them frictionally together, so that the worm cannot be turned by the load, the disks 22 being held absolutely by the grip of the brake 24 on the barrel 23. The extent of the frictional action of the clutch is directly proportional to the load on the screw, increasing as the load increases.

When it is desired to lower the load, the lever 27 is turned from the position shown in Fig. 1 to a position in which the higher portion of its cam or eccentric bears on the casing. This causes an endwise movement of the rod 26 and releases the brake band 24. The barrel 23 is now free to turn, and the entire friction clutch device including said barrel now turns with the shaft 19, the quick-pitch worm being driven from the screw through the worm-wheel. This allows the jack to run down under the load, and the lowering action can be controlled by manipulation of the lever 27.

The lowering is stopped at any point desired by moving the control lever so as to apply the brake. In this operation momentum will cause the flat faces of the disks 21 to slip somewhat on the faces of the members 22, before coming to rest, so that the shock of arresting the moving weight is softened. This is important, both as a means of saving the mechanism and to avoid the accidents which have occurred with self-lowering jacks, designed for heavy duty. The clutch thus acts as a cushion brake or slippage connection, wherein the slippage is overcome and the load brought to rest by the action of the load itself; so that a prompt but not abrupt stopping is produced. In this connection it will be understood that the heavier the load, the greater will be the momentum, but the greater also the end-thrust, and consequently as long as the friction faces possess a sufficient excess of surface for holding, the slippage can be only of a useful character, and slight in extent.

Also, the friction clutch device may be left in and the lowering controlled by the crank 20. In such case the manual effort has merely to overcome the excess friction between the disks, causing the disks 21 to rotate between the stationary disks 22, without, however, removing the pressure; consequently the jack can descend no faster than the manual operation of the crank permits, and, notwithstanding that the worm is of quick pitch, the operator sustains none of the load, and the constantly acting braking effect of the multiple disk device will hold the load as soon as he ceases to turn the crank. In this manner, the jack can be lowered to any desired extent, and stopped in the exact desired position.

The advantages of my invention will be apparent to those familiar with jacks of this type, since it provides a high-speed jack capable of handling large loads with perfect safety, the locking action against accidental lowering of the load increasing as the load increases. At the same time, the invention provides means whereby the load may be either quickly or gradually lowered to any desired extent whenever necessary, and whereby the jack may be operated quickly in the absence of load.

The method of construction and mode of operation is simple, and the parts thereof are strong and of durable character. The direct association of the load-applied lock and its manual control means, with the quick-pitch worm, upon the one shaft or axis, is a feature of important simplicity, making for economy, compactness, durability and reliable action.

The overrunning clutch 14, 15 makes it unnecessary for the worm gearing 16, 18 and parts connected with the worm to be driven from the screw in the load-lifting operation, but this is not essential to the operation as in any event the pressure is removed from the disks at such time.

I claim:

1. A jack having a lifting screw adapted to be rotated by the action of the load, and means for actuating the screw to lift the load, in combination with a worm-wheel having connection with the screw, a worm meshing the worm-wheel and adapted to be driven thereby, and a cushion-slippage locking device subject to the end-thrust of the worm.

2. A jack having a lifting screw adapted to be rotated by the action of the load, and means for actuating the screw to lift the load, in combination with a worm-wheel having connection with the screw, a worm meshing the worm-wheel and adapted to be driven thereby, a manually-operated brake, and a cushion-slippage connection between the brake and the worm subject to the end-thrust of the worm.

3. A jack having a lifting screw adapted to be rotated by the action of the load, and means for actuating the screw to lift the load, in combination with a worm-wheel having connection with the screw, a worm meshing the worm-wheel and adapted to be driven thereby, a cushion-slippage locking device subject to the end-thrust of the worm, manually operated control means for causing the worm to be held or released, and manually operated means for rotating the worm.

4. A jack having a lifting screw adapted to be rotated by the action of the load, and means for actuating the screw to lift the load, in combination with a worm-wheel having connection with the screw, a worm meshing the worm-wheel and adapted to be driven thereby, a manually-operated brake, a cushion-slippage connection between the brake and the worm subject to the end-thrust of the worm, and manually operated means for rotating the worm.

5. A jack having a lifting screw adapted to be rotated by the action of the load, and means for actuating the screw to lift the load, in combination with a worm-wheel having connection with the screw, a worm meshing the worm-wheel and adapted to be driven thereby, a locking device comprising frictional slippage members adapted to be locked together in holding relation to the load by the end-thrust of the worm, and manually operated means for rotating the worm with said members in contact.

6. A jack having a lifting screw adapted to be rotated by the action of the load, and means for actuating the screw to lift the load, in combination with a worm-wheel having connection with the screw, a worm meshing the worm-wheel and adapted to be driven thereby, and locking means comprising flat-faced friction elements adapted to be locked together in holding relation to the load by the end-thrust of the worm.

7. A jack having a lifting screw adapted to be rotated by the action of the load, and means for actuating the screw to lift the load, in combination with a worm-wheel having connection with the screw, a worm meshing the worm-wheel and adapted to be driven thereby, and a multiple friction disk device subject to the end-thrust of the worm.

8. A jack having a lifting screw adapted to be rotated by the action of the load, and means for actuating the screw to lift the load, in combination with a worm-wheel having connection with the screw, a worm meshing the worm-wheel and adapted to be driven thereby, a multiple friction disk device subject to the end-thrust of the worm, and manually operated control means operative upon one part of said device.

9. A jack having a lifting screw adapted to be rotated by the action of the load, and means for actuating the screw to lift the load, in combination with a worm-wheel having connection with the screw, a worm meshing the worm-wheel and adapted to be driven thereby, a multiple friction disk clutch subject to the end-thrust of the worm, and a manually operated brake related to one part of the clutch.

10. A jack having a lifting screw adapted to be rotated by the action of the load, and means for actuating the screw to lift the load, in combination with a worm-wheel having connection with the screw, a worm meshing the worm-wheel and adapted to be driven thereby, a multiple friction disk lock subject to the end-thrust of the worm, and manual means for rotating the worm.

11. A jack having a lifting screw adapted to be rotated by the action of the load, and means for actuating the same to lift the load, a worm-wheel having connection with the screw, and a worm and worm-shaft, the worm meshing the worm-wheel and adapted to be driven thereby, a barrel surrounding the worm-shaft, a set of friction members connected to the barrel, a coöperating set of friction members connected to the shaft, and means whereby the barrel may be held against movement or may be free to turn with the worm-shaft.

12. A jack having a lifting screw adapted to be rotated by the action of the load, and means for actuating the same to lift the load, a worm-wheel having connection with the screw, and a worm and worm-shaft, the worm meshing the worm-wheel and adapted to be driven thereby, a multiple-disk friction device on the worm shaft comprising a barrel and two sets of friction members connected to the barrel and shaft, respectively, and a brake coöperating with the barrel.

13. In a jack, the combination with a vertically movable load member, and mechanism adapted to run down under the load and including a worm-wheel having connection with the load-member and a worm adapted to be driven by said worm-wheel, of a lock composed of flat-faced friction elements adapted to be compacted by end-thrust of the worm.

14. A jack having a lifting screw adapted to be rotated by the action of the load, and means for actuating the screw to lift the load, a worm-wheel having connection with the screw and a worm meshing the worm-wheel and adapted to be driven thereby, a friction locking device subject to the end-thrust of the worm, and manually operated control means cooperating with said device for causing the worm to be held or released, said worm, locking device and control means being associated upon the one axis.

15. A jack having a lifting screw adapted to be rotated by the action of the load, and means for actuating the screw to lift the load, a worm-wheel having connection with the screw and a worm meshing the worm-wheel and adapted to be driven thereby, a friction clutch subject to the end-thrust of the worm, and a brake coöperating directly with the clutch.

16. A lifting jack having a lifting screw adapted to be rotated by the action of the load, means for actuating said screw to raise the load, a two-part overrunning clutch, one member of which is mounted to rotate with the screw and the other member of which is loosely mounted with respect to the screw, the last-named member having worm-teeth thereon, a quick-pitch worm meshing the teeth of said member, and frictional locking means subject to the end-thrust of the worm.

JOHN C. KOPF.